United States Patent Office 3,051,517
Patented Aug. 28, 1962

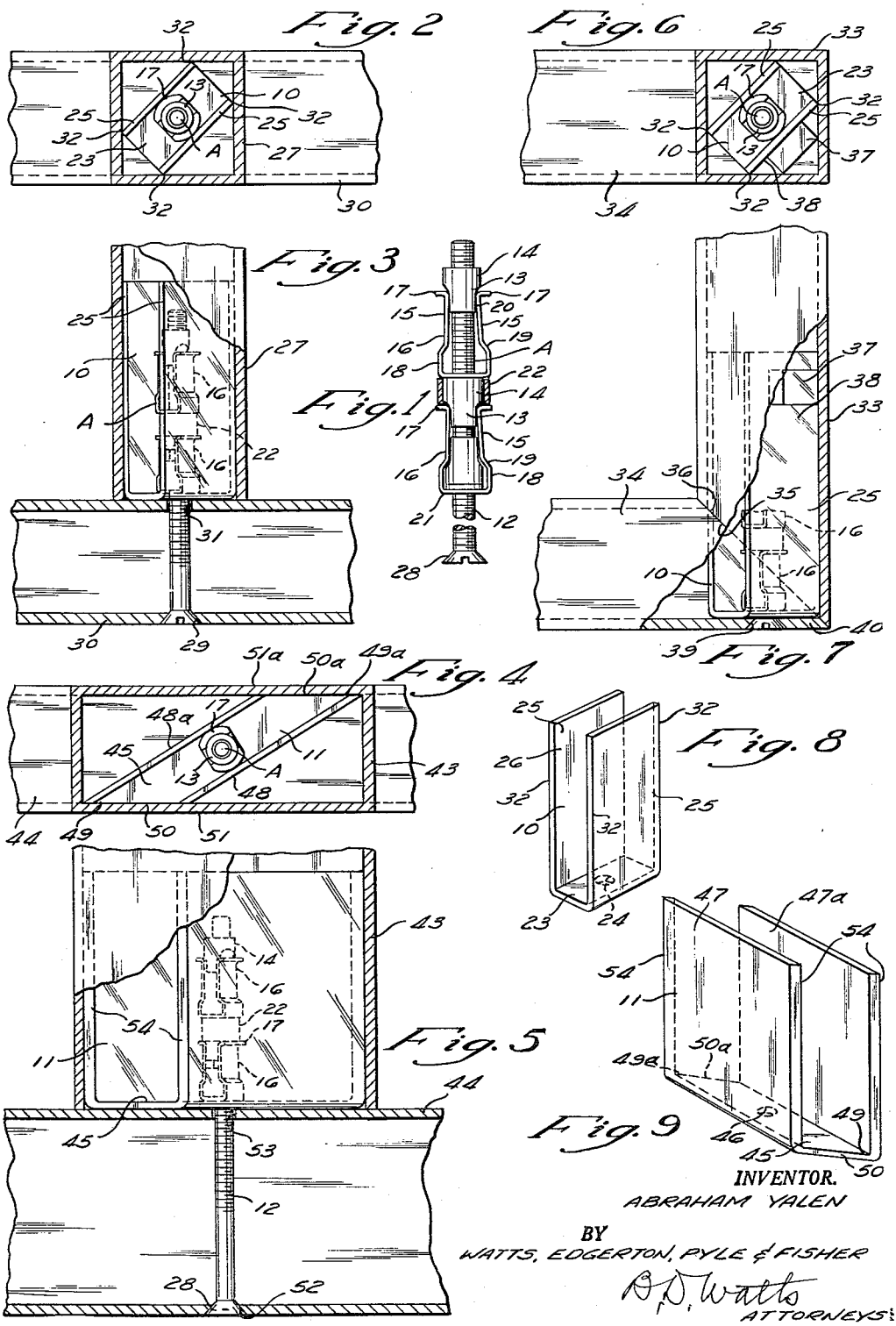

3,051,517
SPRING METAL U-SHAPED ANCHOR
Abraham Yalen, 2292 S. Taylor Road,
Cleveland Heights 18, Ohio
Filed Jan. 17, 1961, Ser. No. 83,199
5 Claims. (Cl. 287—54)

This invention is a continuation-in-part of my copending application filed on June 8, 1959, Serial No. 818,926, now Patent No. 2,972,495, dated February 21, 1961, entitled, "Spring Metal U-Shaped Anchor."

The present invention pertains broadly to improvements in the coupling mechanism for joining tubes, metal conduit sections and similar hollow bodies, and more specifically to expansible spring metal U-shaped members having fixed spaced apart parallel side walls or arms and a uniform standardized anchor expansion mechanism therebetween for uniting various size rectangular tubes wherein the smaller transverse sectional dimension of the tube is much greater than the overall dimension across the said fixed spaced parallel side walls of the said U-shaped members.

The primary object of the invention is to provide a spring metal U-shaped member of a hollow tube joining mechanism having spaced apart parallel side walls in which the dimension between the said side walls remains fixed with respect to the use of the said U-shaped member in joining various size tubes having larger transverse sectional inside dimensions.

Another object of the invention is to provide a spring metal U-shaped member for joining thin walled tubes having the parallel side walls thereof fixedly spaced apart and where the width of said side walls is proportioned to the diagonal dimension of a transverse section of a rectangular tube.

Still another object of the invention is to provide a spring metal U-shaped member for joining thin walled tubes, elongated rectangular in transverse section, the said member having a rhomboid base with parallel side walls or arms fixedly spaced apart and extending upwardly at right angles from said base and having a standardized anchor mechanism disposed between said side walls for joining tubes of various sizes and in which the dimension of the said rhomboid base between the diagonal acute angles thereof is substantially equal to the diagonal dimension of the transverse section of the tube and the edges of the said base extending between the said pair of side walls are parallel to the adjacent wall of the tube to effect a frictional engagement of the edges of said side walls of said U-shaped member with the inner walls of said tube and consequent abutting relation of a similar tube retained on the head of a draw bolt.

Another object of the invention is to provide a positioning boss on a side wall or arm of said spring metal U-shaped member of a hollow tube joining mechanism to guide said member for proper diagonal placement within a tube.

Another object of the invention is to provide a hollow tube joining unit that may be used for joining tubes of various transverse sectional dimensions without changing the standardized anchor expansion mechanism or the dimension between the side walls or arms of the spring metal U-shaped tube engaging member.

Further objects of the invention reside in the provision of a tube joining mechanism for tubular sections of a rectangular or square transverse section which is economic of manufacture, designed for ready assembly, and formed to eliminate unsightly, welded, braised, or soldered joints.

Other objects and advantages more or less ancillary to the foregoing objects, and the manner to which all the various objects are described will appear in the following description, which considered in connection with the accompanying drawings, sets forth the preferred embodiment of the invention.

Referring to the drawing:

FIG. 1 is a vertical view of an anchor expansion mechanism;

FIG. 2 is a top plan view of an assembly of a pair of square metal tubes united in T form;

FIG. 3 is an elevational view of FIG. 2 with the said tubes partially in section;

FIG. 4 is a top plan view of an assembly of a pair of rectangular metal tubes having a width greater than the thickness and united in T form;

FIG. 5 is an elevational view of FIG. 4 with the tubes partially in section;

FIG. 6 is a top plan view of an assembly of a pair of square metal tubes united in an end mitered form with a positioning boss on one arm of the spring metal U-shaped member;

FIG. 7 is an elevational view of FIG. 6 with the tubes partially in section;

FIG. 8 is a perspective view of the spring metal U-shaped member as shown in FIGS. 1, 2, 6 and 7;

FIG. 9 is a perspective view of the spring metal U-shaped member as shown in FIGS. 4 and 5.

Referring to the various figures of the drawing it will be seen that the tube joining mechanism comprises an anchor expansion member A and an expansible spring U-shaped member 10 for use in joining tubes square in transverse section, and an anchor expansion member A, and an expansible spring U-shaped member 11 for use in joining tubes rectangular in transverse section where the width of the tube is greater than the thickness.

Referring first to FIG. 1 the uniform standardized anchor expansion member A is shown in my co-pending application Serial No. 818,926 now Patent No. 2,972,495, dated February 21, 1961, and comprises a draw bolt 12 threaded throughout its length and tapered wedge blocks 13 threaded thereon with the larger end 14 thereof engaged between the vertical arms 15 of a spring metal clip 16.

The spring metal clip 16 comprises a pair of spaced parallel arms having transverse wings 17 on the free ends thereof, and an enlarged lower end 18 defined by shoulders 19 in the lower third of the length of the clip. The wedge blocks 13 are formed of round bar stock with flat tapered lands 20 disposed intermediate the wings 17. The base 21 of the spring clip 16 has an opening therein for the draw bolt 12. The spring clips 16 are spaced apart on the draw bolt 12 by a sleeve 22 that abuts the base 21 of the upper spring clip 16 and the wings 17 of the lower spring clip 16.

For use in uniting tubes of a square transverse section, in the example illustrated in FIGS. 2, 3, 6 and 7 herein, the expansible spring U-shaped member 10 has a rectangular base 23 with a central opening 24 therein to receive said draw bolt 12 and parallel rectangular side walls or arms 25 extending upwardly at right angles from said base 23. The said side walls 25 are uniformly spaced apart to engage the wings 17 of said clips 16. The width 26 of the said side walls 25 is proportional for free sliding movement within a metal tube 27 square in transverse section in planes parallel to the diagonal longitudinal plane of said transverse section of said tube 27.

In operation as shown in FIGS. 2 and 3 for a butt joint, the draw bolt 12, which is formed with a flat head 28 thereon, is first inserted and seated in a chamfered counterbore 29 in a second tube 30, then the free end of the bolt is inserted through the opening 31 in the opposed wall of the tube 30 and then through the opening 24 in the base of the said U-shaped member 10. A spring metal clip 16, wedge block 13, sleeve 22, and the second spring clip 16, and wedge block 13 are successively mounted on said bolt 12 between the side walls 25 of said spring U-shaped member 10.

The spring U-shaped member 10 and the anchor expansion member assembly A are next inserted into the tube 27 so that the said side walls 25 lie in planes parallel to the diagonal longitudinal plane of said transverse section of said tube 27. The draw bolt 12 is then rotated by a screw driver in a cross slot in the head 28 of said bolt to retract the wedge blocks 13 and effect the distention of the arms 15, and also the distention of the side walls 25 of the spring U-shaped member 10.

It will be seen that the engagement of the two spaced pairs of wings 17 with the side walls 25 of the said U-shaped member will effect a uniform expansion of the side walls 25 so that the outer edges 32 thereof will be impinged upon the adjacent inner walls of said tube 27. Continued rotation of the draw bolt 12 will then draw the end of the tube 27 into abutting engagement with the outer wall of the tube 30.

As shown in FIGS. 6 and 7 for a miter joint, the tubes 33 and 34 are square in transverse section and are mitered at the ends 35 and 36 respectively. A positioning boss 37 is centrally secured to the outer face 38 of a side wall or arm 25 of the spring U-shaped member 10.

In operation as shown in said FIGS. 6 and 7 for a miter joint, the draw bolt 12, which is formed with a flat head 28 thereon, is first inserted and seated in a chamfered counterbore 39 located centrally of the outer wall 40 of the end 36 of the second tube 34 and then through the opening 24 in the base of the said U-shaped member 10. A spring metal clip 16, wedge block 13, sleeve 22, and the second spring clip 16 and wedge block 13 are successively mounted on said bolt 12 between the side walls 25 of said spring U-shaped member 10.

The spring U-shaped member 10 and the anchor expansion member assembly A are next inserted into the mitered end 35 of the tube 33 so that the said side walls 25 lie in planes parallel to the diagonal longitudinal plane of said transverse section of said tube 33, and so that the edges of the mitered end 35 of the said tube 33 engage like edges of the mitered end 36. The draw bolt 12 is then rotated by a screw driver in cross slot in the head 28 of said bolt to retract the wedge blocks 13 and effect the distention of the arms 15, and also the distention of the side walls 23 of the spring U-shaped member 10.

It will be seen that the positioning boss 37 will prevent the spring U-shaped member 10 from rotating while the draw bolt 12 is being rotated, and that engagement of the two spaced pairs of wings 17 with the side walls 25 of the said U-shaped member will effect a uniform expansion of the side walls 25 so that the outer edges 32 thereof will be impinged upon the adjacent inner walls of said tube 33. Continued rotation of the draw bolt 12 will then draw the mitered end of the tube 33 into engagement with the mitered end of the tube 34.

In FIGS. 4 and 5 for a butt joint the tubes 43 and 44 respectively are shown as being elongated rectangular in transverse section. For use in uniting tubes of an elongated rectangular transverse section, in the example illustrated in FIGS. 4 and 5 herein, the expansion spring U-shaped member 11 has a rhomboid base 45 with a central opening 46 therein to receive said draw bolt 12; a pair of parallel rectangular side walls or arms 47 and 47a extend upwardly at right angles from said base 45 and have a standardized anchor mechanism A disposed between said side walls 47 and 47a. The said side walls 47 and 47a are uniformly spaced apart to engage the wings 17 of said clips 16. The widths 48 and 48a of the said side walls 47 and 47a are proportional for free sliding movement within said metal tube 43, the dimension of the said rhomboid base 45 between the diagonal acute angles 49 and 49a thereof is substantially equal to the diagonal dimension of the said transverse section of the tube 43, and the edges 50 and 50a of the said base extending between the said pair of side walls 47 and 47a are parallel to the adjacent walls 51 and 51a of the tube 43 to effect a frictional engagement of the edges of said side walls 47 and 47a of said U-shaped member 11 with the inner walls of said tube 43 and consequent abutting relation of a similar tube 44 retained by the head of a draw bolt 12.

In operation as shown in FIGS. 4 and 5 for a butt joint, the draw bolt 12, which is formed with a flat head 28 thereon, is first inserted and seated in a chamfered counterbore 52 in a second tube 44, then the free end of the bolt is inserted through the opening 53 in the opposed wall of the tube 44 and then through the opening 46 in the rhomboid base of the said U-shaped member 11. A spring metal clip 16, wedge block 13 and sleeve 22 and the second spring clip 16, and wedge block 13, are successively mounted on said bolt 12 between the side walls 47 and 47a of said spring U-shaped member 11.

The spring U-shaped member 11 and the anchor expansion member assembly A are next inserted in the tube 43 so that the said opposite acute angles 49 and 49a of the said rhomboid base 45 lie in the diagonal longitudinal plane of said transverse section of said tube 43, and the draw bolt 12 is rotated by a screw driver in a cross slot in the head 28 of said bolt to retract the wedge blocks 13 and effect the distention of the arms 15, and also the distention of the side walls 47 and 47a of the spring U-shaped member 11.

It will be seen that the engagement of the two spaced pairs of wings 17 with the side walls 47 and 47a of the said U-shaped member 11 will effect a uniform expansion of the side walls 47 and 47a so that the outer edges 54 thereof will be impinged upon the adjacent inner walls of said tube 43. Continued rotation of the draw bolt 12 will then draw the end of the tube 43 into abutting engagement with the outer wall of the tube 44.

It will be seen also that simply by fitting the length of the base of the spring U-shaped member proportional to the diagonal dimension of the transverse section of a tube to be joined that the same fixed and uniform size combination of an anchor expansion member A and a spring U-shaped member may be used to unite hollow metal tubes of any size larger than the O.D. dimension across the side walls or arms of the said U-shaped member.

Although the foregoing description is necessarily of detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. The combination of thin wall tubular bodies and a tube coupling device therefor comprising:
  (a) thin wall tubes rectangular in transverse section,
  (b) the end of at least one said tube being end cut for abutting engagement with a second tube,
  (c) a coupling device for joining said tubes comprising a spring metal U-shaped tube engaging member wherein the dimensions of the transverse section of the abutting tube are larger than the dimension between the outside surfaces of the side walls of said U-shaped member adjacent the free ends thereof when expanded and an anchor expansion mechanism member,
  (d) said U-shaped member having a parallelogram base with a centrally located opening therein and rectangular side walls perpendicular thereto and extending upwardly therefrom in parallel planes on opposite sides of the longitudinal plane of the diagonal of said transverse section of said abutting tube, the said side wall edges disposed in longitudinal sliding engagement within said abutting tube and position retaining means therefor, (e) the said anchor expansion member is mounted between the side walls of said U-shaped member and in substantial alignment therewith, (f) the said anchor expansion mechanism member having an upper and lower U-shaped spring clip each having an opening in the base thereof, (g) the arms thereof extending in the same direction and relative position as the side walls of the said U-shaped member and arranged in co-axial alignment with the base opening thereof, (h) lateral wings on the upper free ends of said spring clips, (i) a draw bolt in said openings in said spring clips and said U-shaped member and extending through a similarly aligned opening in at least one surface of a second tube, (j) an upper and lower wedge block screw threaded on said draw bolt with the larger ends thereof superjacent said wings whereby rotation of said draw bolt will distend the wings into impinged relation with the side walls of said U-shaped member and effect the frictional engagement of the edges thereof with the adjacent inner walls of said tube and join said tube into abutting joint engagement with said second tube.

2. The coupling device for uniting thin wall tubes set forth in claim 1 in which a side wall of said U-shaped member has a positioning stud secured to the outer surface thereof adjacent the free end of said side wall.

3. The combination of thin wall tubes and a coupling device therefor as set forth in claim 1 in which an end of each said tube is cut for an abutting miter joint engagement and the said draw bolt extends through an opening located centrally in the outer wall of the said mitered end of a second tube and aligned with similar openings in the bases of said U-shaped member and U-shaped spring clips, whereby rotation of said draw bolt will distend the wings into impinged relation with the side walls of said U-shaped member and effect the frictional engagement of the edges thereof with the adjacent inner walls of said first tube and join said tube into an abutting mitered joint engagement with said second tube.

4. The combination of thin wall tubular bodies and a tube coupling device therefor comprising:

(a) thin wall tubes elongated rectangular in transverse section, (b) the end of at least one tube being end cut for abutting engagement with a second tube, (c) a coupling device for joining said tubes comprising a spring metal U-shaped tube engaging member wherein the dimensions of the transverse section of the abutting tube are larger than the dimension between the outside surfaces of the side walls of said U-shaped member adjacent the free ends thereof when expanded, and an anchor expansion mechanism member, (d) said U-shaped member having a rhomboid base with a centrally located opening therein and rectangular side walls perpendicular thereto and extending upwardly therefrom in parallel planes on opposite sides of the longitudinal plane of the diagonal of said transverse section of a tube, (e) the said rhomboid base having its dimension between the opposite acute angles thereof substantially equal to the inside diagonal dimension of the said transverse section of the abutting tube and having the ends of said rhomboid base extending between the said side walls thereof in parallel relation to the adjacent inner walls of said tube, (f) the said anchor expansion member is mounted between the side walls of said U-shaped member and in substantial alignment therewith, (g) the said anchor expansion mechanism member having an upper and lower U-shaped spring clip each having an opening in the base thereof, (h) the arms thereof extending in the same direction and relative position as the side walls of the said U-shaped member and arranged in co-axial alignment with the base opening thereof, (i) lateral wings on the upper free ends of said spring clips, (j) a draw bolt in said openings in said spring clips and said U-shaped member and extending through a similarly aligned opening in at least one surface of a second tube, (k) an upper and lower wedge block screw threaded on said draw bolt with the larger ends thereof superjacent said wings whereby rotation of said draw bolt will distend the wings into impinged relation with the side walls of said U-shaped member and effect the frictional engagement of the edges thereof with the adjacent inner walls of said tube and join said tube into abutting joint engagement with said second tube.

5. The combination of thin wall tubes and a coupling device therefor as set forth in claim 4 in which an end of each said tube is cut for an abutting miter joint engagement and the said draw bolt extends through an opening located centrally in the outer wall of the said mitered end of a second tube and aligned with similar openings in the bases of said U-shaped member and U-shaped spring clips, whereby rotation of said draw bolt will distend the wings into impinged relation with the side walls of said U-shaped member and effect the frictional engagement of the edges thereof with the adjacent inner walls of said first tube and join said tube into an abutting mitered joint engagement with said second tube.

References Cited in the file of this patent

UNITED STATES PATENTS

| 2,004,727 | Keller | June 11, 1935 |
| 2,972,495 | Yalen | Feb. 21, 1961 |